Figure 1:
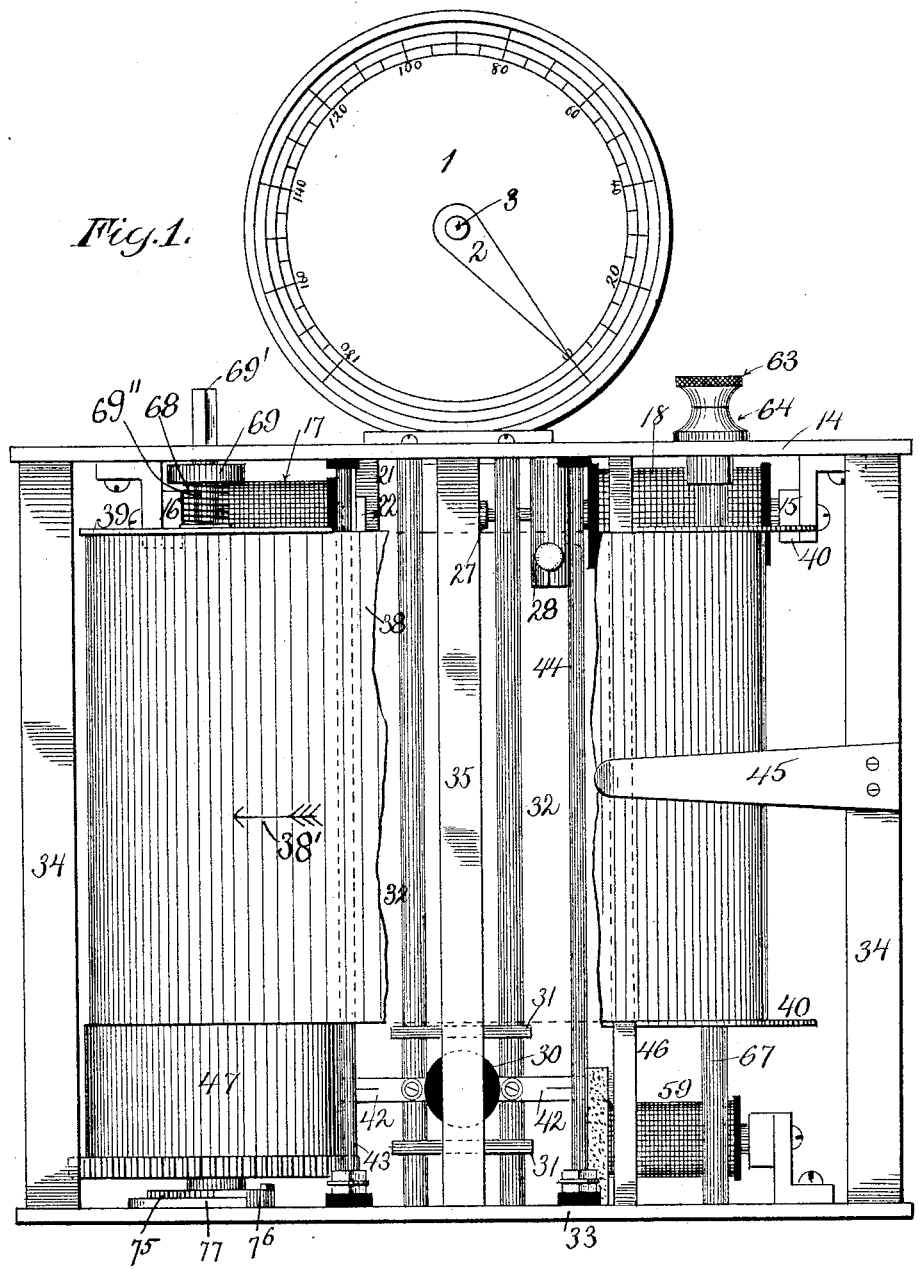

(No Model.) 7 Sheets—Sheet 1.

C. W. AYTON.
RECEIVER FOR TELEMETER SYSTEMS.

No. 498,872. Patented June 6, 1893.

Witnesses:
D. W. Gardner
Nellie R. Pope

Inventor:
Charles W. Ayton
By his Attorney,
Edward P. Thompson (No Model.) 7 Sheets—Sheet 2.
C. W. AYTON.
RECEIVER FOR TELEMETER SYSTEMS.
No. 498,872. Patented June 6, 1893.
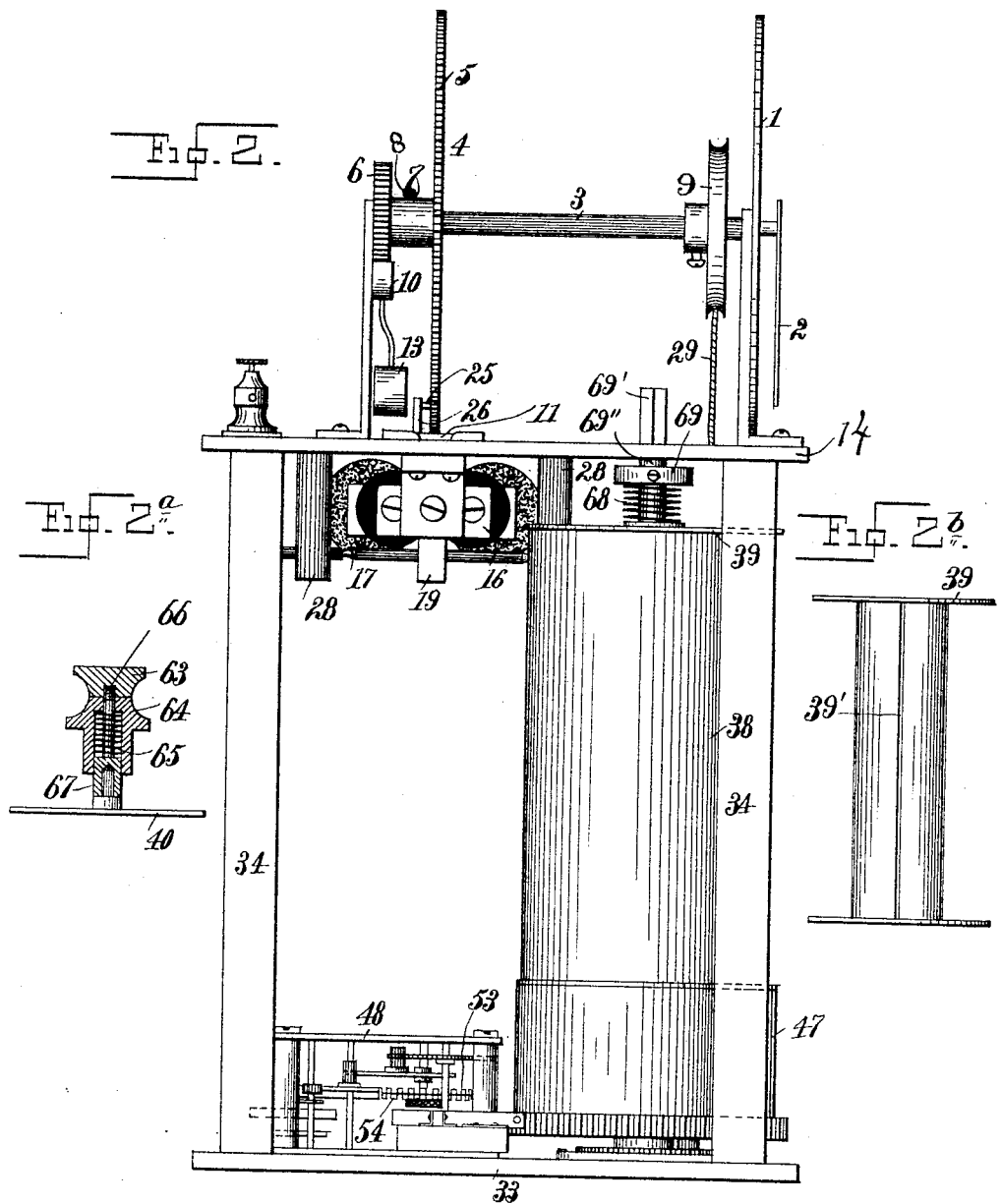
Witnesses
W. H. Courtland
Nellie L. Pope.
Inventor
CHARLES W. AYTON.
BY HIS ATTORNEY
Edward P. Thompson (No Model.) 7 Sheets—Sheet 3.
C. W. AYTON.
RECEIVER FOR TELEMETER SYSTEMS.
No. 498,872. Patented June 6, 1893.
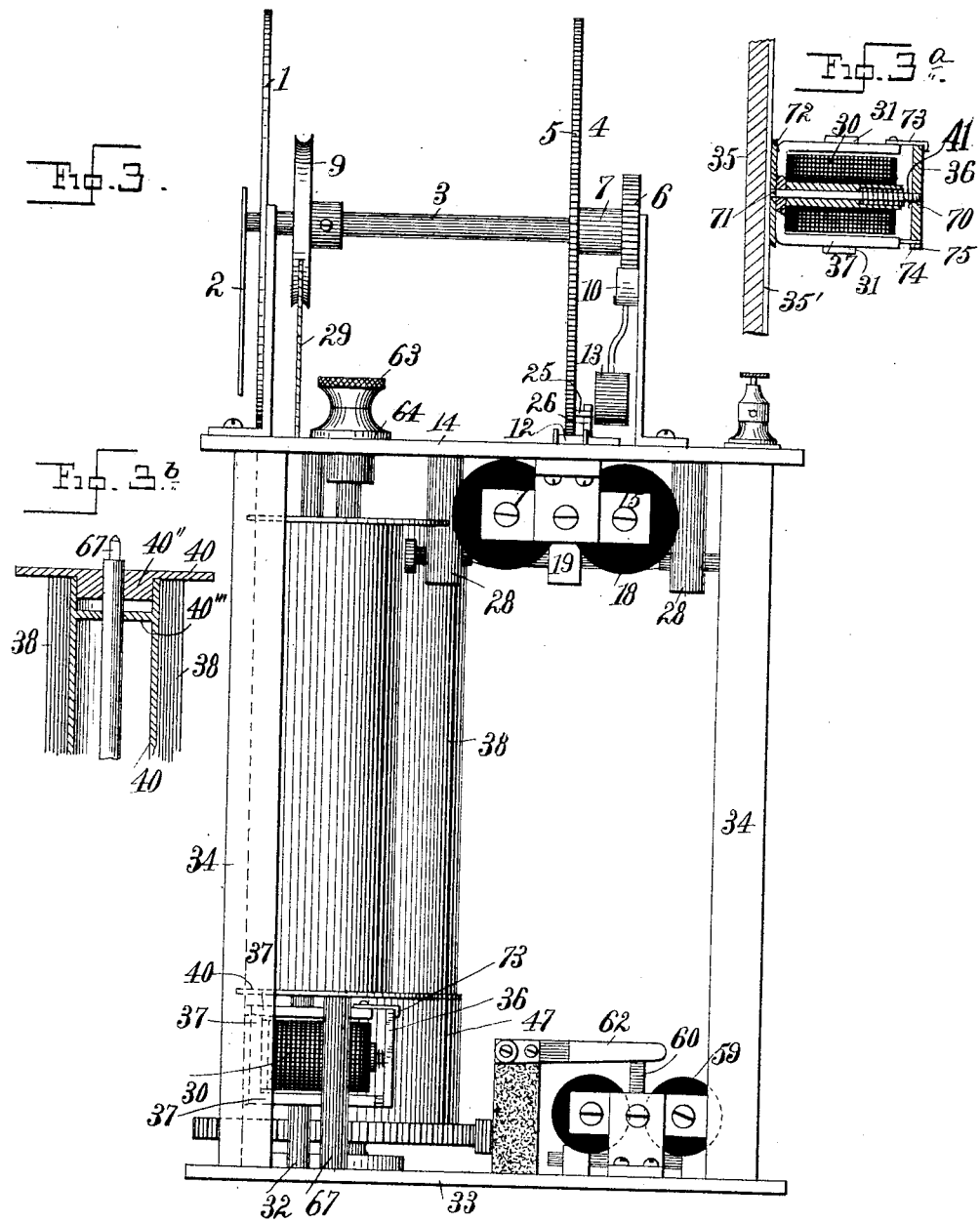
Witnesses
W. H. Courtland
Nellie L. Pope
Inventor
CHARLES W. AYTON
BY HIS ATTORNEY
Edward P. Thompson (No Model.) 7 Sheets—Sheet 4.
C. W. AYTON.
RECEIVER FOR TELEMETER SYSTEMS.
No. 498,872. Patented June 6, 1893.
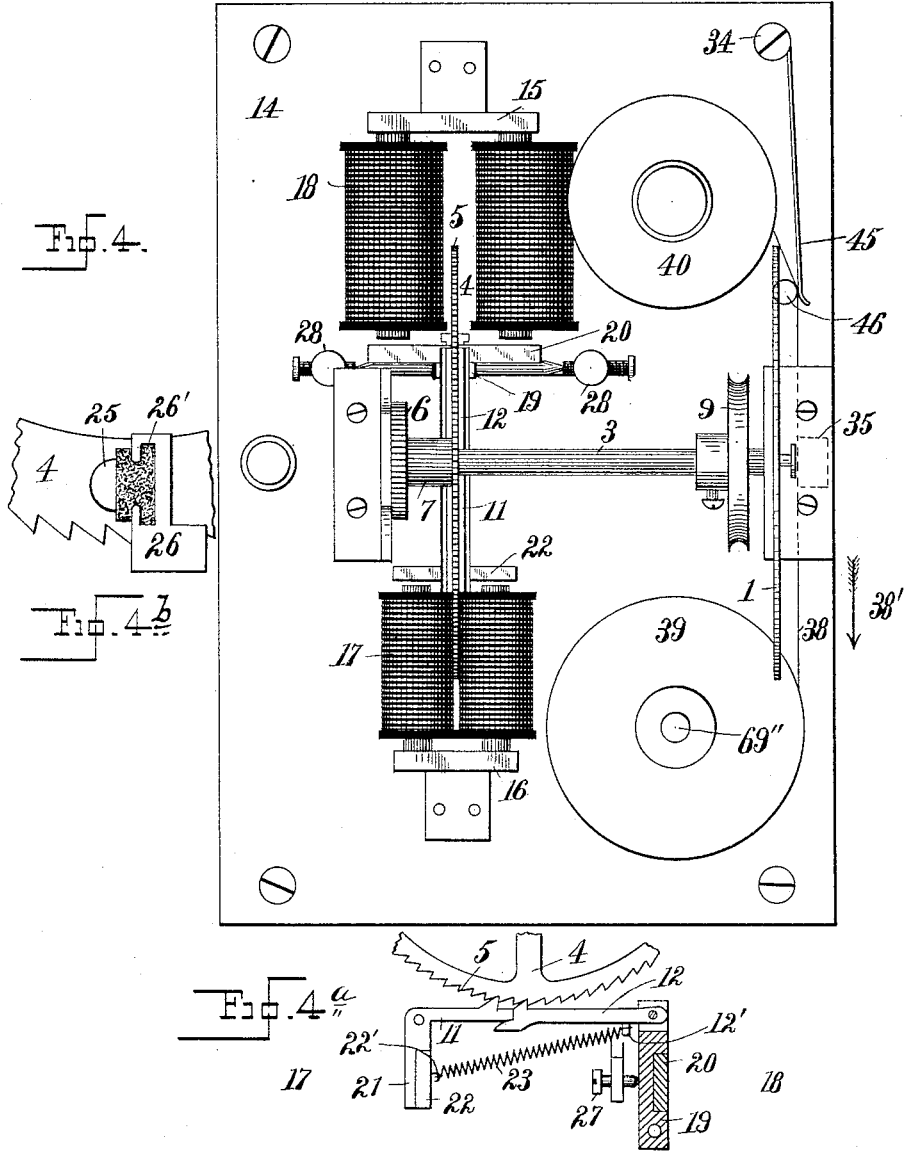
Witnesses
W. H. Courtland
Nellie L. Pope
Inventor
CHARLES W. AYTON
BY HIS ATTORNEY
Edward P. Thompson (No Model.) 7 Sheets—Sheet 5.
C. W. AYTON.
RECEIVER FOR TELEMETER SYSTEMS.
No. 498,872. Patented June 6, 1893.
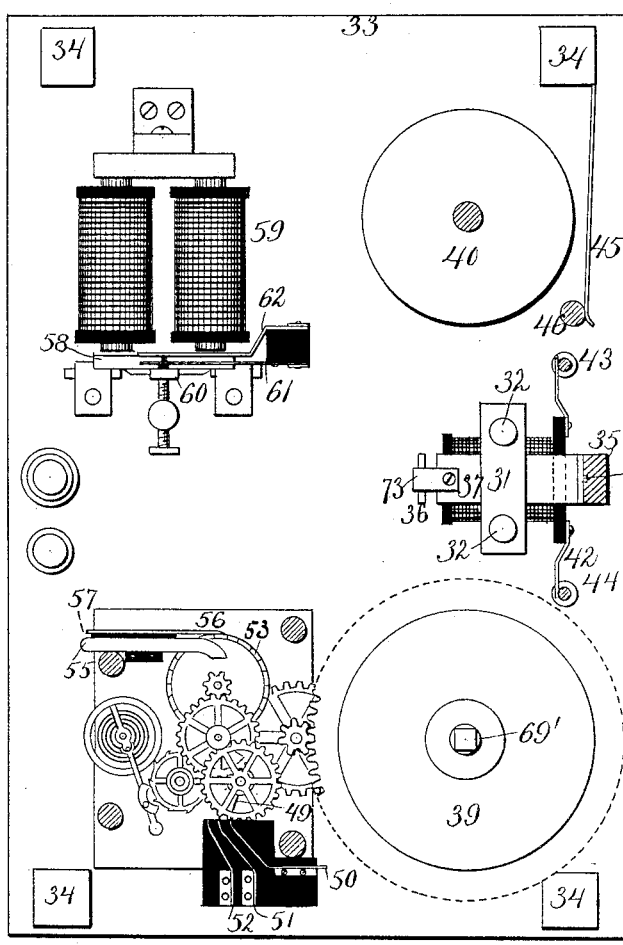
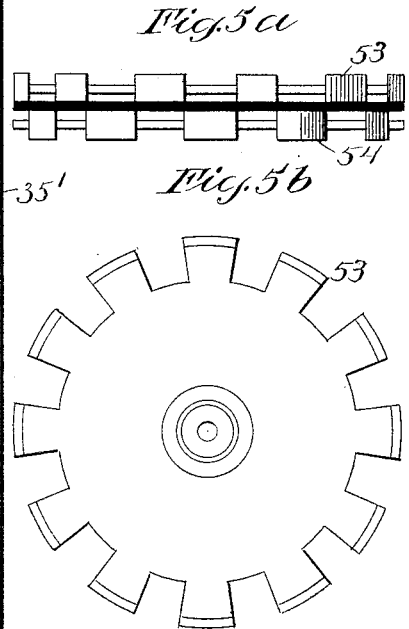
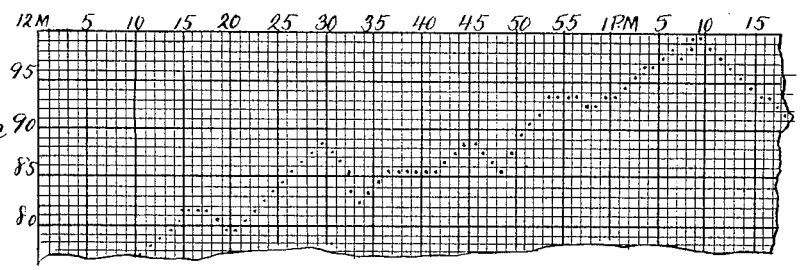
Witnesses:
D. W. Gardner
Nellie L. Pope
Inventor:
Charles W. Ayton
By his Attorney,
Edward P. Thompson

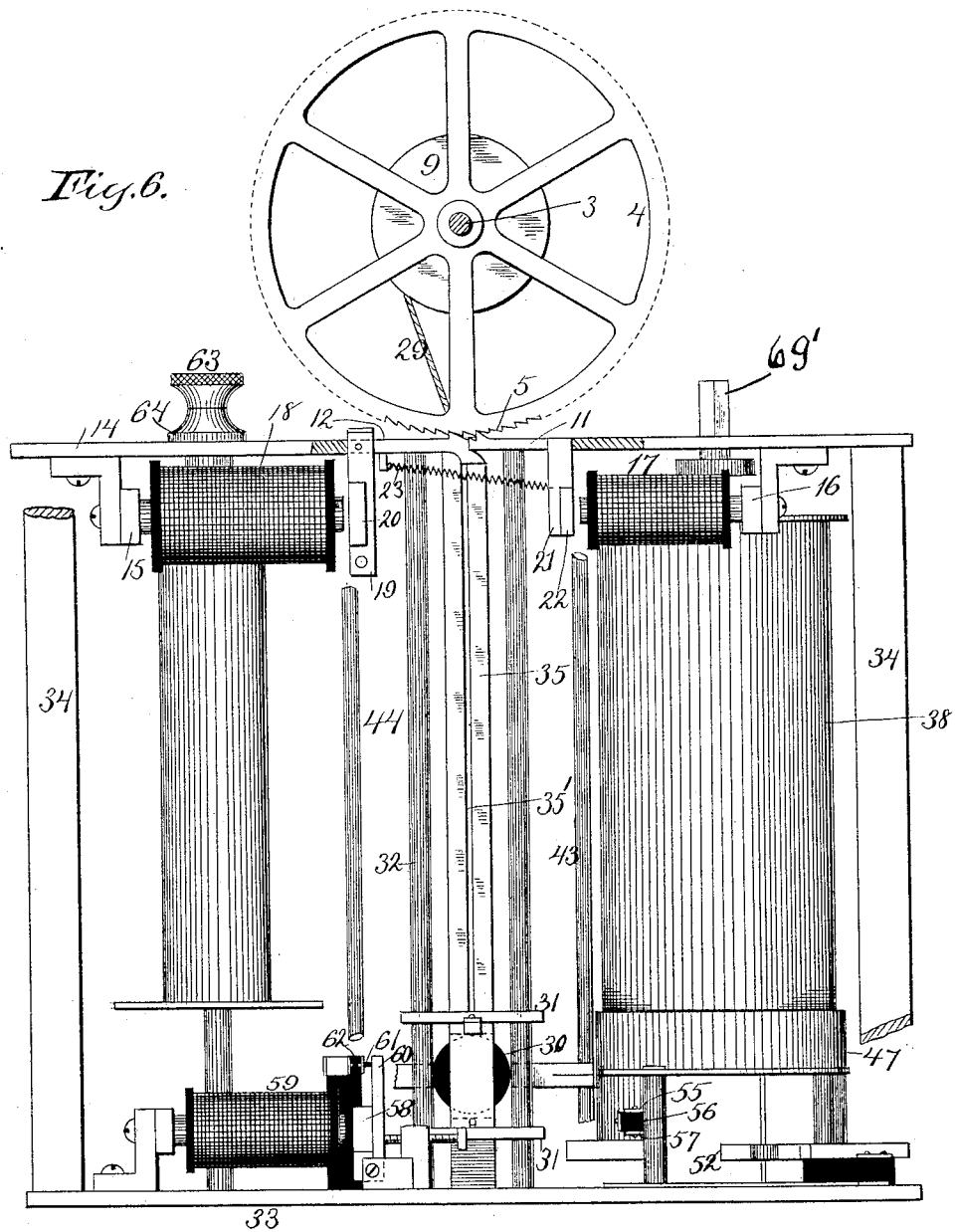

(No Model.) 7 Sheets—Sheet 7.
C. W. AYTON.
RECEIVER FOR TELEMETER SYSTEMS.
No. 498,872. Patented June 6, 1893.
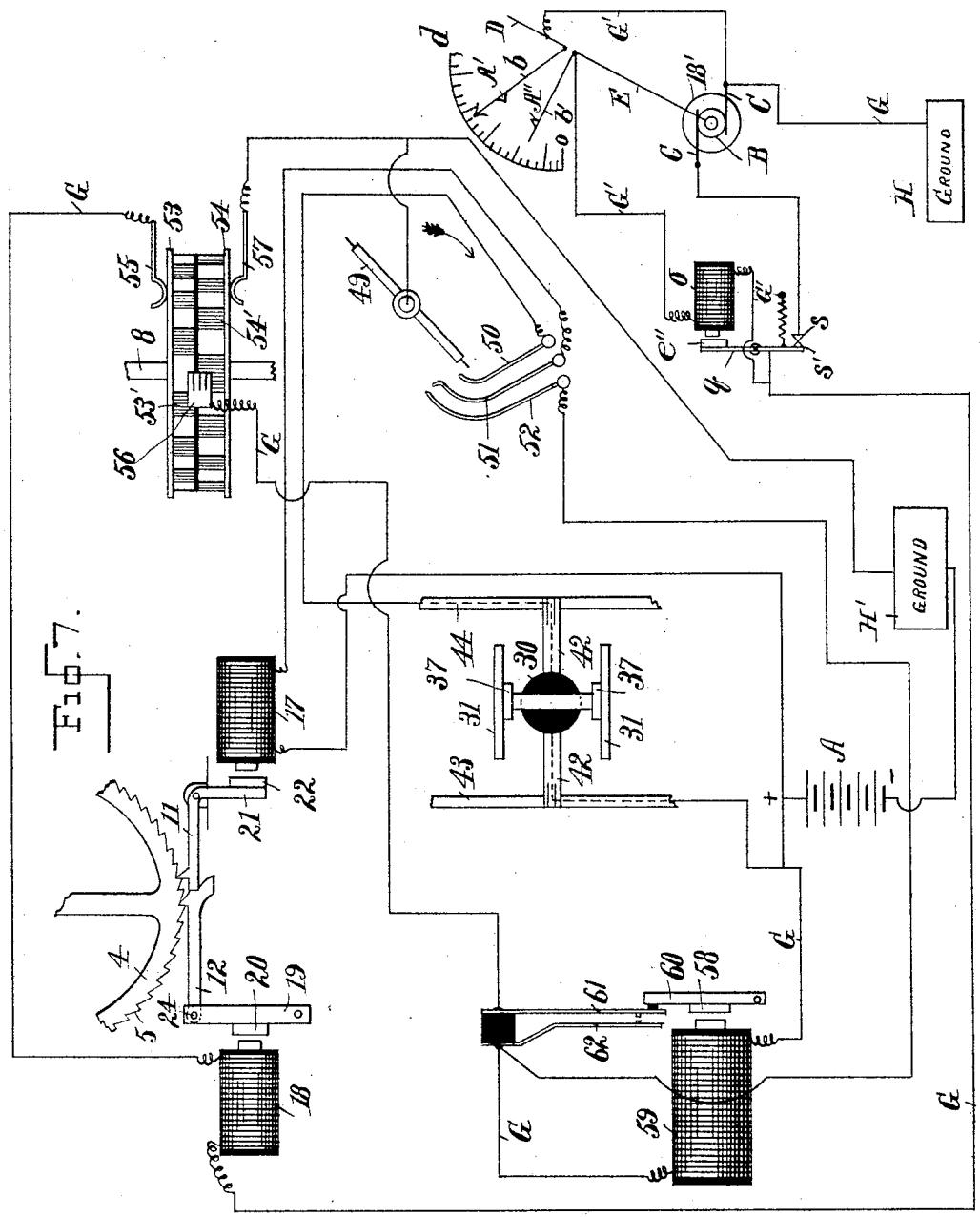
Witnesses
W. H. Courtland
Nellie L. Pope
Inventor
CHARLES W. AYTON
BY HIS ATTORNEY
Edward P. Thompson

UNITED STATES PATENT OFFICE.

CHARLES WILLIAM AYTON, OF NEW YORK, N. Y.

RECEIVER FOR TELEMETER SYSTEMS.

SPECIFICATION forming part of Letters Patent No. 498,872, dated June 6, 1893.

Application filed June 7, 1892. Serial No. 435,829. (No model.)

*To all whom it may concern:*

Be it known that I, CHARLES WILLIAM AYTON, a citizen of the United States, and a resident of New York, in the county of New York and State of New York, have invented certain new and useful Improvements in Receivers for Telemeter Systems, (Case No. 6,) of which the following is a specification.

The invention relates to the details of construction of a receiver for a telemeter system and its object is to provide, especially, an instrument adapted to indicate and register at a distance the readings of a steam gage, electric meter or similar measuring instrument, the receiver to be operative in full by the use of a single main line with ground return.

I have filed another application, Serial No. 420,933, filed February 10, 1892, which relates to the same subject matter in part, as this invention, and I claim therein certain features which are not claimed in this application.

Figure 1 is a front elevation of the receiving device connected with the system. A part of the recording paper is broken away in order to show certain internal constructions. Fig. 2 is a side elevation. Fig. 2$^a$ is a section of the adjusting mechanism for roller 40. Fig. 2$^b$ is an elevation of the complete roller 39. Fig. 3 is an elevation of the other side. Fig. 3$^a$ is a section of the punching magnet and its framework. Fig. 3$^b$ is a section of the roller 40, showing also its shaft, and internal construction. Fig. 4 is a plan of the device in which the top plate is considered the same as if it were made of glass, so that certain parts underneath may be visible. Fig. 4$^a$ is a side elevation partially in section of a detail of Fig. 6. Fig. 4$^b$ is a detail of a section of the wheel 4. Fig. 5 is a plan with the said top plate removed entirely together with the accessories which are held by the plate, so that the plan of the device in the lower part of the instrument is seen. The top plate of the clock is also removed. Figs. 5$^a$ and 5$^b$ are separated views of the periodic circuit closer in Fig. 5. Fig. 5$^c$ shows the record paper. Fig. 6 is a rear view, showing elements which are not clearly visible in other views. Fig. 7 is added for the purpose of setting forth the electrical circuits.

The receiving instrument is located at a sub-station and is described as follows, the characters of reference being numerals, unless possibly in one or two instances.

It may be stated that the object of the receiving instrument is both to record or register a curve which will indicate the fluctuations of steam pressure or current or whatever form of energy is being measured; and also for the purpose of indicating to the eye at any instant, the exact degree of pressure or current, &c., which exists in the steam engine or circuit at a distant or central station.

1, is the dial plate on which are arranged marks around the circumference to indicate predetermined degrees of any given form of energy.

2 is the index hand rotary about the center of the dial plate and mounted upon the arbor 3. Upon said arbor, is fixed a wheel 4, provided with teeth throughout its whole circumference, the teeth being numbered 5, and being in the form of ratchet wheel teeth, and therefore, the wheel may be called a ratchet wheel. The wheel is of comparatively large diameter, especially as compared with the ratchet wheel 6, which is fixed upon the same shaft. In order that the two may be attached to the said shaft, there is a common hub 7, to which the two wheels are rigidly connected. A set screw 8, fastens the hub to the shaft 3. Further, on the same shaft is a pulley 9, which is fixed to the shaft. A pawl 10, engages in the wheel 6, and two pawls in the wheel 4, the same being numbered 11, and 12, while a flexible cord 29 is connected in the groove of the pulley, and carries at its opposite end, in a suitable frame, a small magnet. The pawl 10, is more properly an escapement, like that of a clock, and is provided with a pendulum 13. The teeth on the ratchet wheel 4, all lean over to one side, and those on the wheel 6, are wedge shaped symetrically with reference to the circumference.

The mechanism thus far described, is all approximately located on and above the top plate 14, of the instrument. The ratchet or pawl 12, is for the purpose of converting the reciprocating motion of an armature into a circular motion of the shaft 3, while the purpose of the detent pawl 11, is to hold the wheel 4, from going backward during the said rotary motion, and at a later instant, to release the wheel so that it can run back to its normal position. The forms of motor for producing this operation are electric, and are represented in the drawings just below the plate 14. The yokes of the magnets are numbered respectively 15, and 16, and are fastened to the said plate on the under side thereof. The tripping magnet is numbered 17, and the propelling magnet, 18.

19 is a pivoted armature carrier, for the armature 20, which belongs to the magnet 18. On the opposite end of the said carrier is pivoted the pawl 12. There is a corresponding carrier 21, on one end of which is an armature 22, and on the other, the pawl 11. The pawls 11 and 12 are connected by a helical spring 23, and the one end of the pawl 11 lies on top of the end of the other pawl 12.

25, is a stop on the wheel 4, and 26, is a post on the plate, against which the wheel may come when arriving at its normal position. The tension of the spring 23, and the proper relative positions of the armatures are adjusted by means of the set screw 27.

The posts upon which the armature 20, is pivoted are numbered 28. They extend downward from the plate 14.

The magnet which is carried by the string 29, is numbered 30, and is mounted in a frame 31, movable longitudinally along two guides 32, which pass through the frame. The guide bars 32, connect the top plate 14, to the base plate 33, the principal means of strength of connection being however, due to the corner pillars 34. The magnet 30, carries a three sided frame, having a fourth movable side consisting of an armature 36, whose motion is such that the armature is always substantially parallel to itself imagined as in some former position. The three sided frame is numbered 37, and is attached not only to the magnet but to the frame 31, so that the magnet and also the two frames 31, and 37, are movable along the pillars, 32. The string 29 is made of cat-gut for great strength and durability.

35, is a post connecting the upper and lower plates before mentioned, and is provided with a groove 35′ on the back extending from the top to the bottom, and located opposite the pin 70. This pin, 70, is guided in the core 36, which is part of the magnet 30, and is attached to the armature thereof. Between the post 35, and the end of the frame 37, and consequently between the post and magnet, is located a sheet of paper 38, which is wound upon rollers 39, and 40. It may be seen that if the point is attracted to the magnet in conjunction with the armature the point will pass through the paper, and that the spring 41 will pull the point back as soon as the current is cut off from the said magnet.

The operation of the part of the instrument described immediately above is as follows:—When a current passes through the magnet 18, the armature thereof is attracted and the wheel 4, is moved through the distance of one tooth, and when the current is interrupted, the spring 23, pulls back the armature 20, while the pawl 11, retains the wheel at the position to which it has been moved. If therefore, an intermittent current is passed through the said magnet, the wheel 4, and shaft 3, will be propelled with a rotary motion in one direction until something happens whereby its motion will be stopped. As will further be explained in the sequel, the magnet 17, is later energized by an electric current, so that its armature 22, being attracted, will trip the pawl 11, and consequently also the pawl 12, so that the wheel will return to its normal position, because the magnet 30, and its accessories have been elevated by means of the cord 29 which becomes wound upon the pulley 9. When the magnet 30 is at its highest position, a current, if passed therethrough, will attract the armature 36, whose attached point will puncture the paper 38. The manner in which the current is enabled to enter the magnet 30 is that brushes 42 are carried on the end of the magnet and bear against electric terminal rods 43, and 44, respectively, which are well insulated from the upper and lower plates 14, and 33. In order that the paper 38, may move under sufficient tension to keep it in a plane as it passes the said point, the spring 45, bears against the post 46, and is fastened to and extends from one of the posts or pillars 34. The paper is located between the said post 46, and spring 45, and its direction of motion is from the roller 40 to roller 39. The roller 39, is connected to the main spring wheel of a set of clock work. The wheel is numbered 47, and is provided with teeth on its lower rim for the purpose of driving the clock work, the principal object of which is not only as a propeller of the paper but also as the operator of the circuit interrupters. The top plate of the clock work is numbered 48. There are two independent sets of circuit interrupters which are described thus:

Upon one of the arbors of the mechanism, is attached a diametrical piece or terminal 49, the ends of which lie in the path of three springs separately located in the circumference described by the motion of the ends of the said terminal 49. The said three terminals of opposite polarity are 50, 51, 52. When the terminal 49, rotates, it comes successively into contact with the terminals 50, 51, and 52, closing electric circuits for the purpose herein described where reference is more particularly made to the diagram of electric connections and circuits. In another part of the clock work, are two disks having teeth which serve as means for breaking the circuit in consequence of the bearing upon the wheels (53, and 54,) of two spring terminals 55, and 56. There is also beneath the wheel 54, a third spring terminal 57. At one side of the clock work is still another circuit interrupter operated by the armature 58, of the magnet 59, the armature being suitably pivoted, and an adjusting screw being applied. The armature is carried by the pivoted piece 60, arranged against and insulated from two contact springs 61, and 62. The organization is such that when the armature is attracted, the circuit is closed at springs 61, 62. One of the terminals, 61, serves also as the retractile spring for the armature. The clock work is wound up by a key applied to the square axle 69' of the wheel 47.

Attention is now invited to Fig. 3ª. The puncturing needle or pin 71, is mounted upon the armature 36, and is surrounded for a part of its length by a helical spring 70, one end of which abuts against the armature and the other against the core of the magnet 30, in the inside thereof. There is a brass or similar non-magnetic plate 72, which is attached to the iron yoke of the magnet, so that the magnet and its adjuncts may slide along the paper 38, with as little friction as possible. It bears against the said paper and forms one of the sliding surfaces. The spring 70, is located in a hole in the core of the magnet. When the current is on, the armature pulls the needle through the paper, making a hole therein, and when the current is off, the needle is retracted by the tension of the spring. The needle 71, serves in connection with the core as a guide for the armature in moving in planes parallel to one another. Another guide is illustrated by the pin 74, which can slide in a slot 75, in the armature 36. A stop 73, is fastened to the frame or yoke 37, and extends outward beyond the armature 36, so as to limit the motion of the armature under the action of the spring 70.

An important feature of the roller 39, is the spring 68, held between the collar 69, which is fastened on the shaft of the roller, and the roller itself which is loose upon the shaft. The spring is continually under tension so that the roller will rotate with the shaft which is also the shaft of the main spring of the clock work. By means of this construction, the roller may be rotated in either direction by hand independently of the spring or clock, so that the paper 38, may be applied and removed without in any way interfering with the clock work. The shaft alluded to is numbered 69'', and is square on the upper end 69' so that the clock work may be wound up by a key.

On Fig. 1 of the drawings are shown the ratchet 75, pawl 76, and spring 77, so that the clock may be wound up. The barrel of the clock is movable and the arbor is normally stationary. The purpose of the spring 68 is to hold the roller 39 in frictional contact with the barrel of the clock in order that the barrel may turn with it.

A detail of construction in connection with the roller 40, is shown in Fig. 2ª. The upper end of the same is provided with a pointed or conical projection 67, which extends into the larger end of a screw 66; and the smaller end of the screw enters a thumb cap screw 63. A coil spring 65, remains compressed between the said larger end and the cap 64, which is attached in a fixed position to the top plate 14. On the lower end of the shaft 67 is a journal, which is a reduced portion of the shaft, rotary in a bearing which is formed simply by a hole in the bottom plate 33. When the cap 63, is pulled upward, the projection 67, is released, and the roller 40 may be entirely removed from the device, and filled with paper, or the paper removed from the roller. By unscrewing the cap 63, from the screw 66, the said screw may be also removed by letting it fall downward.

In Fig. 2ᵇ, is shown on a reduced scale, the roller 39. It is provided with a slot 39'. The end of the roll of paper is inserted in this slot, and then the roller 39, is turned whereby the paper is rolled upon the roller, and may subsequently be removed.

The number of teeth on the wheel 4, may represent the indicating and registering capacity of the system, because, for each unit of energy on the transmitter, the wheel moves through the distance of one tooth. The dial plate 1, would have as many divisions as there are teeth in the wheel 4.

In Fig. 5ᶜ is shown the record as it appears as it comes from the machine. The dots thereon, represent the holes which are punctured in the same by the pin 71. The numbers at the top indicate the time in minutes, while the figures at the left indicate the number of units of energy. By means of this record, it may be observed and learned just what the pressure in a steam gage is at any given instant, and also what it was at any previous time, so as to be a check upon the attendant.

The roller 40, is hollow. Near the end is a plate 40'''. This closes the roller near the end, leaving a space for the projection 40'' which fits into the roller, and forms the bearing for the shaft 67, which also passes through the plate 40''', which plate is that used to close the end of the roller. By removing the head of the roller, the paper 38, may be removed or placed in proper position for operation.

In order that the operation of the instrument may be explained, it is shown connected up in a circuit, which also includes at a distant station means, shown in diagram, which may be employed for the sake of illustration, but the actual transmitter, is not fully explained in this case, as it does not form a part of the receiver.

As a matter of convenience and decrease of confusion, letters are used in the diagram of the transmitter.

In Fig. 7, *b*, represents the needle of the steam gage, electric meter, or other instrument which has an indicating needle or equivalent.

Perhaps, the best place or phase at which to start, is at the terminal 52. When the rotating terminal 49, comes into contact with terminal 52, a circuit from the battery is closed through the magnet 59. This circuit may be traced as follows: It begins, for instance, at the positive pole, goes to the magnet, 59, then to the brush 52, then to the terminal 49, then to the ground, and finally (or directly without first going to ground) it passes to the negative pole of the battery A, from which it started. The closing of this circuit, causes, evidently, the attraction of the armature 58, and the closing of the terminals 61, and 62. In other words, the main line G, becomes closed, whenever the terminal 49, comes into contact with the terminal 52. Further, it will now remain closed during a certain period, although the terminal 49, is in contact with the terminal 52, only an instant. The reason is this:—The brush 56, which forms a terminal in electric connection with the terminal 61, continually touches either one or the other of the metallic portions of the wheels 53, 54, and the brushes 55, and 57, are continually in contact respectively with the wheels 53, and 54. These wheels are continually rotating by the action of clock work. The wheels 53 and 54 have the same speed relatively to one another and move comparatively fast. Their motion is easily apparent, but the arm 49 moves so slowly that its motion during one or two seconds of sight, is not visible. It may be said that the speed of the wheels 53 and 54 is great in comparison to that of the arm 49. When the brush 55, is electrically in contact with the brush 56, and the terminals 61, 62, have been closed as set forth, it is evident that the main line is maintained closed through the magnet 59, during the passage of the brush 56, over the metallic portion of the wheel 53. Before the brush 56 leaves contact with the wheel 53, it comes into contact with the wheel 54, and consequently, the current from the battery A, can go still through the contacts or terminals 61, 62, and through the brushes 55, 57, the ground H', and the magnet 59. In brief, the current energizes the magnet 59, and thereby maintains the terminals 61, 62, closed, by first flowing through the brushes 56, 55, and then through the brushes 56, and 57. This action will continue until the main line is opened at the transmitter, which may if necessary, for the sake of illustration, be accomplished by hand. By a diagram, it is shown how it is opened by the action of the needle $b$; but before entering into the consideration, of this feature, it is necessary first to explain what happens before the main line is again opened by this needle. Although the terminals 61, 62, remain closed, it is not true that the main line circuit is also kept closed thereby. In view of the terminals or brushes 56, 55, being first electrically closed and opened by the presence of teeth thereon like a commutating wheel, the main line current is intermittent, the effect of which is to vibrate the armature 20, and rotate the wheel 4, through the medium of the ratchet 12, because the magnet 18, is included in the main line circuit. At the transmitter is a similar intermittent current motor, represented typically by a ring B, and brushes C. This motor numbered 18' and the magnet 18 are so constructed as to move synchronously. The magnet 18, rotates wheel 4, and the motor 18' rotates the arm $b'$, which is on the motor's axis. The arm $b'$ is carried by the arbor in the motor B.

In consequence of the synchronous motions of the two motors, the needle 2, on the receiver is propelled to the same distance as the needle or arm $b'$ which stops as soon as it indicates the same number of degrees as indicated by the needle $b$, of the steam gage. The reason of this is thus explained. The projection or electric terminal $A''$ touches the terminal $A'$ as soon as the two elements $b$, and $b'$ have moved through the same arc. The said terminals are in circuit with the magnet $o$, and therefore the latter is energized, and the armature $e''$ is attracted, and the main line circuit is opened at the terminals $s, s'$ the armature being a part of the circuit closer, of which the terminals are $s, s'$. The circuit G' has less resistance than the circuit G. As soon as the two contacts $A'$, and $A''$ have touched, they may again be pulled apart, and the arm $b'$ returned to zero, from which it started. When the arm $b'$ was at its maximum position, the needle 2, was also at its maximum position, and indicated at the distant location of the receiver, just how many pounds of steam were indicated at the steam gaged. When the terminals $s, s'$ were opened, it is evident that the motors stopped. All this has been done during the rotation of the terminal 49, from the terminal 52, until it is about to come into contact with the terminal 50. When this happens, a current is sent through the magnet 30, and a hole punctured in the record paper. The path of this current, is from the positive pole of the battery A, to the rod 43, to the brush 42, to the magnet 30, to the other brush 42, to the rod 44, to the terminal 50, to the terminal 49, to the ground and then to the negative pole of the battery A. It is noticeable that the record paper 38, is propelled by the clock work, and is located on the arbor thereof, which corresponds to the shaft for carrying the hour hand of a clock. The paper is subdivided into spaces, by vertical lines in such a manner that each space represents one minute. Therefore the time that it takes for the terminal 49, to leave and return to the terminal 50 is just one minute. The terminal 49, is in fact, the seconds hand of a clock. At the end of every minute, therefore, the paper is punctured, at a greater or less height on the paper, according to the distance to which the arm $b'$ has to travel in order to come into contact with the arm or needle $b$.

Very soon after the terminal 49, leaves the terminal 50, it comes into contact with the terminal 51, and closes a circuit which may be traced thus: It starts at the positive pole of the battery A, and goes to the magnet 17, then to the terminal 51, then to the terminal 49, then to the ground H' and then to the negative pole of the battery A. The armature 22, is therefore attracted and the ratchet 11, trips the ratchet 12, and the wheel 4, is returned to its original position because the weight of the magnet 30, unwinds the cord 29 from the pulley 9. The needle 2, therefore returns to zero on the dial plate 1. The magnet 17, must be energized long enough to allow the magnet 30, to fall all the way down the slides 32, and for this purpose, the terminal 52 has its end turned around to lie in the arc of a circle of which the center is that of the terminal 49. Therefore, the terminals 49, and 51 remain in contact a few seconds. While the magnet 30, is falling, the escapement 10, and pendulum 13, together with the wheel 6, prevent too great velocity and jarring of the instrument. Again, the pawl 11 serves to hold the pawl 12, away from the wheel 4, by means of the projection on pawl 12, which lies under the pawl 11. The spring 23, serves the useful purpose of forcing the pawl 11, into the spaces between the teeth 5, when the pawl 12, is receding from said spaces during the operation of the electric motors. The spring 23, serves also as an ordinary retractile spring for the pawls 11, and 12. As soon as the terminal 49, comes again into contact with the terminal 52, the same operation as above described is performed over again and so on for an indefinite time. Each time a point is scored upon the record paper in the form of a hole, and all the holes taken together form a line which indicates the relative fluctuations of the needle $b$. If this needle only goes half the distance that it did before, the needle $b'$ will touch it in half the time and the point or needle 71 will puncture the paper at only half the height.

As shown the needle 2 shows the readings of the needle $b$, every minute.

In practice, the insulators 53' and 54' are air so that the brush 56 can touch one wheel before it leaves the other.

During the return of the wheel 4, to its normal position either without or with the pendulum and escapement, a great deal of noise is made by the action of the pin 25, striking the post 26. Accordingly, I prefer to omit the pendulum and escapement respectively, 13, 10, and provide the said pin with a cut away portion, and let it come up flat against a piece of rubber which is fastened to the post 26. The construction here alluded to is shown in Fig. 4$^b$, where 26' shows the piece of rubber. The weight of the magnet 30, causes the wheel to return very rapidly, and the pin comes with great force against the rubber, but the sound is very slight to that which exists when the rubber is not at hand.

The remaining and important details of construction and functions of certain parts are now described.

One end of the spring 23, is fastened directly to the armature 21, by the hook 22, while the other end is connected to the projection or pin 12' which hangs down from the pawl 12. The pawl 12, is pivoted substantially at right angles to the armature 20, while the pawl 11, is fixed at the same angle in reference to the armature 21. The pivots of the armatures 20, 21, are carried by the plate 14, of the instrument, while the pivot of the pawl 12, is carried by the armature holder 19. The support for the set screw 27, is stationary.

It is plain that the paper 38, should be kept taut, and for this purpose, the spring 45 is extended from the corner post 34 and bears upon the paper which is located between the post 46, and said spring. The paper travels in the direction of the arrow 38'. The post 46 is in such a location that the plane of the paper is coincident with the surface of the post 35. On this account it makes little difference as to the location of the roller 40 or as to how much paper it contains.

I claim as my invention—

1. A combined indicating and recording telemeter receiver, consisting of the combination of a movable record paper and dial plate; an arbor 3, carrying a pulley 9, and index hand 2, normally pointing to zero on said dial plate; an electro magnet 30 suspended from the periphery of said pulley by a cord 29, and facing the said paper, and movable in a direction at right angles to the direction of the paper; an armature for the magnet carrying a puncturing needle at right angles to the surface of the paper; the needle just escaping, normally, the paper; a ratchet wheel on the arbor 3; a pawl 12, engaged with said wheel and controlled by the armature 20, of a magnet 18; the armature 20, being pivoted to a stationary arbor, and the pawl 12, being pivoted to said armature; the armature, pawl, and wheel being so relatively located that a vibratory motion of the armature gives a motion of one direction to the wheel and therefore, to the arbor 3; a second pawl 11 upon the end of which, the pawl 12 rests; a magnet 17; an armature therefor fastened to the said pawl 11 and pivoted to a fixed arbor, the pawl being engaged with said wheel; and a retarding pendulum and escapement engaged with a wheel 6, which is located upon the arbor 3.

2. In a telemeter receiver, a puncturing device for making a record in a moving paper, consisting of the combination of a magnet whose axis is perpendicular to the surface of the paper; a frame 37, carrying the magnet and having a stationary core relatively thereto extending into the magnet and having a hole in the said core; an armature having a puncturing needle secured thereto which needle passes through the said hole and just escapes, normally the paper; a retractile spring in the hole and abutting respectively against the armature and the said core, and normally under compression; a stop 73, attached to said frame and holding said armature against the reaction of the said spring; a post 35, on the opposite side of the paper from the said needle, and provided with a groove which is exactly opposite the point of the needle, the post standing parallel to the surface of the paper; a second frame 31, or supporting bars provided with holes; rods 32, which pass through the holes and serve for the purpose set forth of guide rods; and a pair of rods 44, 43, against which the terminals of the said magnet bear; the bars 31, being fastened to the frame 37.

3. In a telemeter system, the combination of a moving record paper; a magnet facing said paper; means for elevating and depressing said magnet; a puncturing needle carried by the magnet and perpendicular to the surface of the paper; an armature controlling said needle, and within inductive distance of said magnet; a post 35, on the opposite side of said paper from the said needle; and a retractile spring for the said armature.

4. In a telemeter receiver, a holder for the roll of recording paper, consisting of the combination of a hollow roller provided with flanges at the ends, between which the paper is held; a projection 40 to one of the flanges, and fitting into the roller; a shaft for the roller, and fastened to the plate 40''' which closes one end of the roller; a screw 66, threaded on the upper end and carrying an enlargement on the other which is hollow to form a bearing for the said shaft 67, of the roller; a cap 63, upon the threaded portion of the said screw; a second cap 64 on the screw and between the first cap and the frame plate 14 of the telemeter receiver, and resting on the said plate; and a spring 65, abutting against the said enlargement, and the cap 64.

5. In a telemeter receiver the combination with a feed roller 40, carrying a web of paper, of a guide rod 46, a spring 45 pressing upon the web which is between the rod and spring, a receiving roller 39 having a slot containing one end of said web, and flanges upon the ends of the roller 39 for holding the web.

6. In a telemeter system, the combination of synchronously acting electro magnets in circuit with an electric generator; means for intermittently closing the circuit of the generator; said means consisting of the combination of an armature 58, controlling terminals 61, 62, whose corresponding magnet is 59 located in the said circuit, which may be called the main circuit, rotating circuit interrupters 53, 54 having each a brush 55, 57 and a common brush 56, the brushes 55, 56, being in the said main circuit, and the brushes 56, 57 being in an independent circuit which includes the magnet 59 and the terminals 61, 62.

7. In a telemeter receiver, an intermittent circuit closer, consisting of the combination of clock work, one of whose arbors carries two wheels 53 and 54 insulated from each other; teeth upon the wheels and so located that the teeth of one wheel are opposite the spaces between the teeth of the other wheel in a direction measured parallel to the axis of the said arbor; a brush 56, lying in the path of the teeth of both wheels; and brushes 55, 57, lying respectively in the paths of different wheels, and permanently in contact with their respective wheels; the brush 56, and teeth being so proportioned that the said brush is permanently in contact with either one wheel or the other.

8. In a telemeter receiver, an electric motor, consisting of the combination of a magnet 18; an armature therefor, 20, pivoted and carrying a pivoted pawl; a wheel 4, provided with teeth with which the pawl engages; a set screw 27 bearing upon the holder 19 of the armature, and serving as described, the purpose of regulating the extent of movement of the said armature; a second magnet 17, and armature 22, therefor, which is rigidly attached to a pawl 11, which also engages with the said wheel 4, and which rests upon the end of the first named pawl; a spring normally under tension and connecting the pawl 12, first named, to the armature 22; a weight suspended from the cord 29, which is attached to the periphery of the wheel 9, fixed upon a shaft 3; the said shaft being common to the wheel 4, and wheel or pulley 9; and means for regulating the motion of the shaft 3, during the falling of the said weight.

9. A telemeter system consisting of the combination of an electrical generator; a main line passing through said generator, and connected to ground at a given main station and at a distant sub-station; a circuit closer consisting of terminals 61, 62; a magnet 59 controlling said circuit closer, a periodic circuit closer consisting of terminals 49, 52; clockwork controlling the terminal 49; a branch or local conductor including in its circuit the terminals 49, 52, and magnet 59; an intermittent circuit closer in main line consisting of the terminals 55, 56; clock-work controlling the last named terminals; a rotary arm $a'$ at the main station, and indicating needle 2 at the sub-station; synchronous electric motors controlling said arm $a'$ and needle 2, located respectively at the two stations; a rotary indicating needle $b$, having a projection $a$ in the path of the arm $a'$; springs acting in opposition to the respective motors; means engaged with the motors for preventing their turning to normal positions, said means consisting substantially of pawls and ratchet wheels; an armature $e''$ and magnet $o$; a magnet 17 and its armature; the armatures of the last named magnets being engaged with the tripping device respectively at the central and sub-station, and the former being in a branch line $G'$ which includes also the arms $a$ and $a'$, and the latter being in a branch line which includes a periodic circuit closer consisting of the terminals 49, 51; and a circuit closer normally closed in circuit with the main line and controlled by the armature $e''$.

10. A telemeter system consisting of the combination of the electrical generator; the circuit closer normally closed and consisting of terminals $s$, $s'$ and a circuit closer normally open and consisting of terminals 61, 62; a motor 18' and magnet 18; an intermittent circuit closer whose terminals are 55 and 56; the above named elements being included in a main line which connects a given central station with a distant sub-station; a magnet 59 having an armature which controls the terminals 61, 62, a rotary terminal 49; contacts or electric terminals 50, 51, 52 in the path of the rotary terminal 49; the terminals 49, 52 and magnet 59, being in an independent circuit from the main line circuit; and located at the sub-station; ratchet wheels engaged to the said electric motors and provided with indicating needles, an electro magnet 30, whose armature is provided with a puncturing point and which is also engaged with the motor which is at the sub-station in such a manner that the operation of the motor in one direction elevates the magnet, and in the other, lowers it, the magnet 30 being in circuit with the terminals 49, 50; a sheet of paper or similar puncturable material movable in front of and perpendicular to the length of the magnet 30; and means for short circuiting the motor 18, and opening the circuit at the terminals $s, s'$, consisting of terminals $A'$, $A''$ carried respectively by the needle $b$, at the central station, and by an arm on the motor at the same station, in combination with a magnet $o$, and armature $e''$ which control the said terminals, the terminals $A'$, $A''$ and magnet $o$, being located in a branch circuit around the said elements to be short circuited, namely the said motor and terminals $s, s'$.

11. In a telemeter system, the combination of electro magnets at independent stations, and in a given main circuit; an indicating device engaged with the armature of that magnet which is at the sub-station; an electric terminal carried by an arm on the armature of the magnet at the central station, and an electric terminal in the path of the first terminal and carried upon the needle belonging to the device, such as a steam gage whose readings are to be transferred to the sub-station; the two terminals being in the path of each other and being rotary about the axis which is common to the last named needle and to the shaft of the armature of the magnet at the central station; an armature $e''$ and magnet $o$; a circuit closer consisting of the terminals $s, s'$ in the said main circuit; and an electric conductor forming a shunt to the magnet at the central station and to the terminals $s, s'$, and including in its circuit the magnet $o$, and terminals $A', A''$.

12. In a telemeter system, the combination of electric magnets respectively at a given central station and at a sub-station; and located in a given main line which also includes an electric generator; a moving sheet of paper for receiving a record of the readings at the sub-station of the indications at the central station; a magnet 30, provided with an armature which has a puncturing needle perpendicular to said paper and which together with the magnet is movable parallel to the surface of the sheet but at right angles to the direction of the motion of the sheet, and is geared or engaged with the armature of the magnet at the sub-station; means at the central station for interrupting the main circuit at periods of time dependent upon the position of the needle which gives the readings at the central station; and means for closing the circuit of the magnet 30, after the interruption of the main line; the said magnet being in an independent circuit from the main circuit.

In testimony that I claim the foregoing as my invention I have signed my name, in presence of two witnesses, this 2d day of March, 1892.

CHARLES WILLIAM AYTON.

Witnesses:
   EDWARD P. THOMPSON,
   E. W. L. BLATZ.